United States Patent [19]

Cobbledick

[11] 3,931,062

[45] Jan. 6, 1976

[54] FLEXIBLE HOT-MOLDED FLAME RETARDANT POLYURETHANE FOAMS

[75] Inventor: David Stanley Cobbledick, Kent, Ohio

[73] Assignee: The General Tire & Rubber Company, Akron, Ohio

[22] Filed: Nov. 8, 1973

[21] Appl. No.: 413,805

[52] U.S. Cl. .................. 260/2.5 AC; 260/2.5 AB; 260/2.5 AJ; 260/2.5 AK; 260/2.5 AZ; 260/2.5 BE
[51] Int. Cl.² .................. C08G 18/14; C08G 18/62; C08K 3/22; C08K 3/26
[58] Field of Search.... 260/2.5 AB, 2.5 AK, 2.5 BE, 260/2.5 AJ, 2.5 AC, 2.5 AZ, 859 PV, 2.5 BB

[56] References Cited
UNITED STATES PATENTS

| | | | |
|---|---|---|---|
| 3,102,875 | 9/1963 | Heiss | 260/2.5 AP |
| 3,476,121 | 9/1969 | Cobbledick | 260/18 TN |
| 3,574,149 | 4/1971 | Harrington | 260/45.75 R |
| 3,644,229 | 2/1972 | Butler | 260/2.5 BE |
| 3,661,862 | 5/1972 | Bonin | 260/859 PV |
| 3,714,077 | 1/1973 | Cobbledick | 260/2.5 BE |
| 3,718,611 | 2/1973 | Maxey | 260/2.5 BE |
| 3,737,400 | 6/1973 | Kumasaka | 260/2.5 AJ |
| 3,857,802 | 12/1974 | Larkin | 260/2.5 BE |

OTHER PUBLICATIONS

Kron & Palmer, "Rubber World", Vol. 156, No. 2, May, 1967, pp. 57–65.

*Primary Examiner*—C. Warren Ivy

[57] ABSTRACT

When a minor amount of an oxide, hydroxide or basic salt of certain metals from Group 2a of the Periodic Table of the Elements is introduced into the formulation for low density flexible and semiflexible hot-molded flame-retardant polyetherurethane foam compositions which also contain finely-divided solid chlorine-containing polymeric resins, zinc oxide (ZnO) and antimony trioxide ($Sb_2O_3$), and optionally a chlorinated paraffin, the resulting foams can be prepared commercially with good reproducibility and good stream stability, and the foams produced are free or essentially free of uncured areas and do not exhibit crumbly or powdery portions.

9 Claims, No Drawings

FLEXIBLE HOT-MOLDED FLAME RETARDANT POLYURETHANE FOAMS

BACKGROUND OF THE INVENTION

It is well known to make flexible urethane foams by hot molding. The molding of any part starts with mixing and pouring from standard polyurethane foam-making equipment. Molds of the appropriate size, usually made of cast aluminum, must be heated to from about 100° to 200°F. before charging to prevent heat loss from the foaming mass. This technique, along with the proper use of a release agent, helps to provide reproducible parts having good properties. Another important factor is the quick heating or curing of the molded foam at a temperature of from about 300° to 450°F. for from about 3–20 minutes. Compression set, a significant property, is influenced by this heating step. Final cure is attained after aging at ambient (room) conditions. Although mechanical and heat transfer variables can be critical in the molding process, the formulation determines most end properties. The largest application for the hot-molded flexible urethane foam is in parts for automobiles, particularly seats.

For example, many of the automobile deep seat foams manufactured have been molded via the hot cure technique. Foams can be molded around steel wires which gives rigidity and a means to anchor the foam part to the car body. A piece of burlap which may become part of the foam during molding is used as an insulator between a flat S shaped spring and the foam cushion.

It has been observed that when a polyetherurethane low density flexible or semiflexible foam formulation containing polyvinyl chloride (PVC), ZnO and $Sb_2O_3$ as described, for example, in U.S. Pat. No. 3,574,149 is used in a hot-molding foam process, many of the foams produced are defective in that they have areas or sections in which the foam crumbles or disintegrates when the mold is opened and the foam removed from the mold. In some instances the foam may appear satisfactory, but then it will readily crumble when a finger is pressed or run along the surface. Even though some foams are initially satisfactory, the system has been observed to change with time so that at the end of a given run many foams are unsatisfactory. Such foams cannot be repaired readily which results in considerable economic loss.

It has been observed that these defective areas occur largely on the surface of the foam and where, in most cases, the liquid foamable mixture discharged from the mixing head or nozzle has run down into the mold to form a puddle or puddles prior to foaming. While the blowing of the foams appears to be complete on opening the mold, the curing or crosslinking reaction appears not to have been completed. In other words, for some reason, the isocyanate-hydroxyl reaction went so far and stopped, the urethane foaming reaction was killed or the activity of the catalyst was inhibited or stopped.

It, therefore, is an object of the present invention to overcome the difficulties alluded to above and to provide a hot-molded flexible or semiflexible low density flame-retardant polyetherurethane foam free or essentially free of surface defects or crumbly areas or portions and/or in which the surface of the foam conforms faithfully with the inner surface of the mold and, also, to provide a method or process for making such foams.

These and other objects which are apparent to those skilled in the art from the following detailed description and examples are satisfied by this invention.

SUMMARY OF THE INVENTION

This invention consists essentially of adding to a particular type of known flame retardant polyetherurethane foam composition (U.S. Pat. No. 3,574,149) a small amount of an oxide, hydroxide or basic salt of a metal from Group 2a of the Periodic Table of the Elements, said metal having an atomic number of 12 to 56 inclusive. The additive is present in an amount from about 0.05 to about 2.5 parts by weight per 100 parts by weight of polyetherpolyol in the foam formulation.

DISCUSSION OF DETAILS AND PREFERRED EMBODIMENTS

In the compositions of this invention the basic ingredients, except for the Group 2a oxides, hydroxides and basic salts, are generally described in the aforementioned U.S. Pat. No. 3,574,149, the disclosure of which is hereby incorporated herein by reference.

The chlorine-containing solid polymers employed herein include polymers, usually resinous in character, of vinyl chloride and vinylidene chloride and mixtures of these monomers as well as copolymers of a predominating molar amount of one or more of these monomers and a minor amount of vinyl acetate, acrylonitrile, methacrylonitrile, dimethyl or diethyl maleate or fumarate, methyl acrylate, methyl methacrylate, ethyl ethacrylate, vinyl stearate and the like and mixtures thereof. Still other halogen-containing resins can be used such as hydrolyzed or partially hydrolyzed copolymers of a major amount of the vinyl chloride and a minor amount of vinyl acetate. Moreover, other resinous polymers can be used such as chlorinated rubber, chlorinated polyethylene, chlorinated polyvinyl chloride and the like. Mixtures of the chlorine-containing polymeric resins can be used.

These chlorine-containing polymeric resins should contain at least 0.4 chlorine atoms per carbon atoms, preferably about 0.5 to 0.7 chlorine atoms per carbon atom, but no more than about one chlorine atom per carbon atom. These polymers are generally finely divided solids having average particle sizes of from about 0.00001 to 1 mm. and have an intrinsic viscosity from about 0.25 to 2.5, preferably from about 0.5 to 1.5, as measured in 0.3 percent by weight solution in cyclohexanone at 25°C. While the chlorine-containing resinous polymers can be used in amounts up to about 100 parts by weight per 100 parts by weight of the polyol, they are generally used in an amount of from about 1 to 50 parts, preferably from about 2 to 25 parts by weight per 100 parts by weight of the polyol to obtain the desired load bearing characteristics. The larger particle size resins can be used in larger amounts within the given ranges. However, the finer or smaller particle size resins should be used in smaller amounts within the ranges shown to avoid the formation of viscous fluids, gels or pastes which are difficult to pump or stir. The chlorine-containing polymers can be made by bulk, solvent, emulsion or suspension polymerization process. A preferred polymer to use is polyvinyl chloride which has been prepared by emulsion polymerization.

Part of the chlorine-containing polymeric resin used in the foam formulation can be replaced with a chlorinated paraffin or with mixtures of chlorinated paraffins. These materials are made by the chlorination of liquid paraffin fractions and/or paraffin waxes. The chlorinated paraffins have average molecular weights of from about 250 to 1400 and chlorine contents of from about 40 to 70% by weight. They can be liquids or solids but are preferably liquid at room temperature (20° to 30°C.). Also, it is preferred that the chlorinated paraffins be odor-free or substantially odor-free. Examples of chlorinated paraffins are the Cereclor (I.C.I. America, Inc.) chlorinated paraffins Nos. 42, S.45, S.52, and 70, and the Chlorowax (Diamond Shamrock Chemical Company) chlorinated paraffins 40, 50 and 70. Still other chlorinated paraffins can be used. The chlorinated paraffin is used in an amount by weight of the chlorine-containing polymeric resin on essentially a percent by weight chlorine (Cl) basis. For example, based on 100 parts by weight of polyol in a given formulation, if 20 parts by weight of polyvinyl chloride (about 57% by weight of chlorine - Cl) containing 11.40 parts of chlorine is reduced to 10 parts by weight of PVC in the formulation, a chlorinated paraffin containing 42% by weight of chlorine (Cl) should be added in an amount of about 13.7 parts by weight to provide a total chlorine content of 11.45 parts by weight. Similar adjustments can be made with other chlorine-containing polymeric resins and other chlorinated paraffins.

Polyols used in making the polyurethanes of the present invention are primary and secondary hydroxy-terminated polyoxyalkylene ethers having from 2 to 4 hydroxyl groups and a molecular weight of from about 1,000 to 10,000. They are liquids or are capable of being liquified or melted for handling in the polyurethane foaming apparatus or machine.

Examples of polyoxyalkylene polyols include linear and branched polyethers having a plurality of ether linkages and containing at least two hydroxyl groups and being substantially free from functional groups other than hydroxyl groups. Among the polyoxyalkylene polyols which are useful in the practice of this invention are the polypropylene ether glycols, the polypropyleneethylene ether glycols, and the polybutylene ether glycols. Polymers and copolymers of alkylene oxides are also adaptable in the process of this invention as well as the block copolymers of ethylene oxide and propylene oxide. Among the copolymers that deserve some special mention are the ethylene oxide, propylene oxide and butylene oxide adducts of ethylene glycol, propylene glycol, diethylene glycol, dipropylene glycol, triethylene glycol, 2-ethylhexane-diol-1,3, glycerol, 1,2,6-hexanetriol, trimethylolpropane, trimethylolethane, pentaerythritol, triethanolamine, triisopropanolamine, ethylenediamine, and ethanolamine. Linear and branched copolyethers of other alkylene oxides are also useful in making the foamed products of this invention as well as the polypropylene diols, triols, and tetrols end-blocked with ethylene oxide to provide primary hydroxyl groups in the polymer and having molecular weights of from about 2000 to 5000.

Examples of useful types of polyetherpolyols are fully depicted in the aforementioned U.S. Pat. No. 3,574,149.

Branched polyethers having a functionality greater than 2 have the advantage of making possible cross linking without the interaction of urea or urethane groups with the isocyanate groups. This has the advantage of making a larger proportion of the isocyanate present available for the evolution of carbon dioxide and reducing of the overall amount of isocyanate that is required in the preparation of the foamed polymer. Mixtures of polyether polyols can be used.

Likewise, there can be used as polyols grafts of ethylenically unsaturated monomers such as acrylonitrile, methacrylonitrile, vinyl acetate, methyl acrylate and the like on the polyols and having the functionality and molecular weight as shown above. Such graft polyols and methods for making the same are shown in U.S. Pat. Nos. 3,304,273; 3,383,351; and 3,294,711.

When desired, cross-linking materials having from 2 to 8 hydroxyl groups can be included in the foam formulation to increase cross link density and so forth. They have molecular weights of from about 60 to 600. Only small amounts of such materials are generally needed (about 0.3 to 10 mols per 100 mols of polyol). Examples of such crosslinking agents are glycol, diethylene glycol, propylene glycol, butane diol-1,4, dipropylene glycol, glycerol, trimethylolpropane, butane triols, hexanetriols, trimethylolphenol, various tetrols, such as erythritol and pentaerythritol, pentols, hexols, such as dipentaerythritol and sorbitol, as well as alkyl glycosides, carbohydrates, polyhydroxy fatty acid esters such as caster oil and polyoxy alkylated derivatives of poly-functional compounds having three or more reactive hydrogen atoms, such as, for example, the reaction product of trimethylolpropane, glycerol, 1,2,6-hexanetriol, sorbitol and other polyols with ethylene oxide, propylene oxide, or other alkylene epoxides or mixtures thereof, e.g., mixtures of ethylene and propylene oxides. Grafted cross-linkers can be prepared by the process of the aforementioned U.S. patents. Mixtures of crosslinkers can be used. All of the polymer-forming ingredients should preferably be free of any amine function which is not sterically hindered or shielded.

Water in an amount of 1 to 5, preferably 1.5 to 3, parts by weight per 100 parts of polyol is used as a blowing agent in the formulation to help produce carbon dioxide to develop foam structure. The water should be treated to remove impurities such as iron, calcium salts and other materials that produce hardness. Preferably, the water should be subjected to treatment with various zeolites and other molecular sieves or distilled to remove virtually all of the impurities.

Any organic di- or tri- isocyanate can be used in the practice of the present invention as set forth in U.S. Pat. No. 3,574,149. Diisocyanates are preferred, particularly when there is any considerable amount of branching in the polyol or crosslinker to avoid the formation of rigid or semi-rigid foams. The preferred di-isocyanates are the aromatic hydrocarbon diisocyanates containing no more than about 30 carbon atoms, preferably no more than about 15 carbon atoms, such as toluene-2,4-diisocyanate and toluene-2, 6-diisocyanate; diphenylmethane-p,p'- or -m,m'-diisocyanates and their polymers; and di-isocyanato methyl benzene. However, other organic diisocyanates and polyisocyanates can be included or substituted as is well known in the art. It is to be understood that mixtures of two or more di- and/or polyisocyanates can be employed as well as both monomeric and polymeric forms.

The isocyanate or isocyanates are employed in amounts sufficient to give 0.9 to 1.3, preferably 1.05 to 1.15, isocyanate groups per total functional groups in the polyol and the water (C), i.e., the total hydroxyl groups, any primary and secondary amine groups and molecules of water. These amounts correspond to an "Index" of 90 to 130, preferably 105 to 115, the "Index" being one hundred times the defined functional equivalence.

If lower density and softer foams are desired there additionally can be added to the polyurethane foam formulation separately or in admixture with one of the other components, e.g., the polyol or polyisocyanate, up to about 25 parts, preferably no more than about 10 parts, by weight of a fluorocarbon blowing agent per 100 parts by weight of the polyol. Examples of such blowing agents are set forth in the aforementioned U.S. Pat. No. 3,574,149 and include monofluorotrichloromethane, dichlorodifluoromethane, trifluoromonochloromethane, 1,1,2-trichloro-1,2,2-trifluoroethane, dichlorotetrafluoroethane, ethylene chloride, methylene chloride, chloroform and carbon tetrachloride. Other useful foaming agents include lower molecular weight alkanes, such as methane, ethane, propane, pentane, hexane and heptane; alkenes such as ethylene and propylene; ethers such as ethyl ether and diisopropylether; mixtures thereof and the like. See, for example, U.S. Pat. Nos. 3,072,582 and 3,391,093.

Catalysts for the polyetherpolyol-polyisocyanate reaction can be any catalyst heretofore used in the art, particularly the metal-containing catalysts, as set forth in U.S. Pat. No. 3,574,149. Preferred catalysts to use are the divalent tin salts of carboxylic acids having from 2 to 18 carbon atoms.

Examples of suitable organotin catalysts (G) include primarily tin carboxylates such as dibutyl tin dilaurate, dibutyl tin di-2-ethylhexoate, stannous octoate, stannous oleate, di-isobutyl tin bis(monobutyl maleate), di-n-butyl tin diacetate, di-2-ethylhexyl tin bis(2-ethylhexoate), tri-n-butyl tin acetate and dibutyl tin distearate and tin alkyls such as tetramethyl tin and tetra-n-butyl tin.

These catalysts are used in an amount of from about 0.1 to 0.9 part by weight per 100 parts by weight of the polyetherpolyol. It is less preferable to use these catalysts, such as the metal salts, alcoholates, hydroxides, alkoxides and phosphines, especially in large amounts, where resins containing ester groups in a substantial amount are used since they tend to hydrolyze the ester linkages thereby causing scission of the backbone polymer chain and lowering of the physical and chemical properties of the resultant foams, especially under conditions of high temperature and humidity.

Surfactants or emulsifiers are generally necessary to provide the desired cell formation and growth. Polysiloxane-polyoxyalkylene block copolymers are preferred. Polysiloxane-polyoxyalkylene block copolymers are described in U.S. Pat. Nos. 2,834,748 and 2,917,480. Another useful class of emulsifiers are the "non-hydrolyzable" polysiloxane-polyoxalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds rather than through carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group and (b) an alkali metal salt of a polyoxyalkylene polymer to a temperature sufficient to cause the polysiloxane polymer and the salt to react to form the block copolymer. Still other polysiloxane-polyoxyalkylene copolymers known to the art may be employed as well as silicones, turkey red oil and so forth. The surfactant is used in an amount of from about 0.3 to 2.5 parts by weight per 100 parts by weight of the polyether polyol.

It is advantageous to incorporate into the urethane compositions of the present invention at least one organic tertiary amine catalyst, preferably together with a metal-containing co-catalyst. The amount of organic amine catalyst may comprise, per 100 parts by weight of organic polyol, about 0.05 to 3.2 parts by weight. In the case of the polyether polyols where metal catalyst is used for the urethane-forming reaction, it is preferred to use only from about 0.5 to 0.9 part by weight of the amine. On the other hand, where the tertiary amine is taking care of both the foaming ($H_2O$+NCO) and network (—ROH+NCO) reactions, the tertiary amines should be used in somewhat larger amounts within the specified ranges. However, since some polyols may differ in residual acid content due to incomplete washing, filtering or ion-exchanging of the neutralized polyol and since antimony trioxide has some catalytic effect during the polyurethane foaming and forming reactions, the amount of tertiary amine may necessarily have to be reduced where large amounts of water are used as the primary blowing agent.

In the urethane compositions of the invention there may be used a wide variety of such organic tertiary amine catalysts as set forth in U.S. Pat. No. 3,574,149. Sterically hindered organic tertiary amines, especially those disclosed in Canadian Pat. No. 855,757 of Edwin M. Maxey and John T. Harrington, entitled "Urethane Foams Containing Halogen Containing Polymers And Methods For Preparing The Same Using Certain Catalysts", issued Nov. 10, 1970, also can be employed in the foam formulations if desired.

The zinc oxide should be finely divided, for example, it should have an average particle size of from about 0.05 to 200 microns, preferably from about 0.15 to 50 microns. The zinc oxide is used in the foam composition in an amount of from about 0.1 to 10 parts by weight, preferably from about 0.2 to 5 parts by weight, per 100 parts by weight of the organic polyol. It should not contain any appreciable amount of impurities which would adversely affect the foaming reaction or the properties of the resulting foams. The zinc oxide can be American process zinc oxide, French process zinc oxide, or zinc oxides produced by other processes. Zinc oxide is a well known material and is shown by (A) "Encyclopedia Of Chemical Technology", Kirk and Othmer, The Interscience Encyclopedia, Inc., New York, Vol. 15, 1956, pages 262–266; (B) "Zinc", Mathewson, Reinhold Publishing Corporation, New York, 1959, pages 346 to 385; and (C) "Compounding Ingredients For Rubber", Third Edition, 1961, Rubber World, New York pages 62 to 89.

Antimony trioxide is a known material. Methods of preparing antimony trioxide and reactions of the same are shown by Kirk-Othmer, "Encyclopedia Of Chemical Technology," 2nd Ed., Vol. 2, 1963, pages 573 to 575 and 2nd Ed., Vol. 15, 1968, page 506 to 507, Interscience Publishers, a division of John Wiley and Sons, Inc., New York. In the polyurethane foam formulation the antimony trioxide is used in an amount of from about 0.5 to 15 parts by weight, preferably from about 1 to 10 parts by weight, per 100 parts by weight of the organic polyol. The antimony trioxide, also, should be finely divided, for example, it should have an average particle size of from about 0.05 to 200 microns, preferably from about 0.15 to 50 microns. It should not contain any deleterious materials which would adversely affect the foaming reaction or the properties of the resulting foam. The smaller particle sizes of antimony trioxide are most effective in the foam.

The chlorine-containing polymeric resin, zinc oxide and antimony trioxide are all employed in effective amounts to provide a flame retardant and/or self-extinguishing polyetherurethane foam. When part of the chlorine-containing polymeric resin is replaced with a given amount of the chlorinated paraffin, the amount of zinc oxide should be reduced by a proportionate amount essentially equivalent to the amount of polymer eliminated. For example, where 5% by weight of the chlorine-containing polymeric resin is replaced with the chlorinated paraffin, then the amount of zinc oxide normally employed should be reduced by about 4–7%, usually 5%, by weight. Where the amount of the chlorine-containing polymeric resin is reduced by 50% by weight (and replaced with an essentially equivalent amount of the chlorinated paraffin on a chlorine basis), the amount of zinc oxide used should be reduced by about 50% by weight.

The novel feature of this invention is the use of certain solid materials to buffer the feed streams in the commercial production of flexible hot-molded flame retardant polyurethane foams, particularly the feed streams containing a significant amount, e.g., 10% or more, of the total polyol in the formulation. These materials include the oxides, hydroxides and basic salts, primarily the carbonates, of certain metals of Group 2a of the Periodic Table of the Elements. While Group 2a includes beryllium, magnesium, calcium, strontium, barium, and radium, the metals of interest for the purposes of this invention are those having atomic numbers of 12 to 56, i.e., magnesium, calcium, strontium and barium, the preferred metals having atomic numbers of 12 to 20, i.e., magnesium and calcium.

While a variety of compounds within this definition are both known and operative, preferred suitable materials include magnesium oxide, magnesium hydroxide, magnesium carbonate (both anhydrous and in its various hydrated forms), calcium oxide, calcium hydroxide, calcium carbonate (both anhydrous and in its various hydrated forms), barium oxide, barium hydroxide, strontium oxide and strontium hydroxide. Particularly preferred are certain magnesium oxides, magnesium carbonate and calcium carbonate.

These solid additives should be finely divided; for example, they should have an average particle size of from about 0.05 to 200 microns, preferably from about 0.15 to 50 microns. They should not contain any deleterious materials which would adversely affect the foaming reaction or the properties of the resulting foam. The smaller particle sizes are most effective in the foam. Since the metal oxides generally absorb $H_2O$ and $CO_2$ readily from the atmosphere, they should be suitably protected from the source by storage in sealed containers before use in making foams, for otherwise adjustment will have to be made in the foam formulation such as in the NCO level and so forth.

It is important that any magnesium oxide employed have an activity index or activity number of from 0 to about 60 which activity may be defined as the iodine number or the milliequivalents of iodine absorbed by 100 grams of the magnesium oxide. A method for determining the iodine number is shown by Deis and Heneghan, "Rubber World", Vol. 150, No. 6, Sept., 1964, pages 64 to 73, especially page 67. Magnesium oxide surface activity, activity index or activity number is well known and also is shown by (1) Deis and Heneghan, "Rubber World", October, 1961, pages 85 to 90; (2) Murray and Thompson, "The Neoprenes", Elastomer Chemicals Department, E. I. du Pont de Nemours & Co. (Inc.), Wilmington, Delaware, 1963, pages 21 to 23; and (3) Kron and Palmer, "Rubber World", Vol. 156, No. 2, May, 1967, pages 57 to 65. It is preferred that the magnesium oxide be obtained from the calcination of magnesium carbonate rather than magnesium hydroxide. If magnesium oxides are used having activity numbers greater than about 60 as set forth above, the resulting foams show poor molding exemplified by loose skin and poor cell structure and exhibit uncontrolled blowing. The magnesium oxide is used in an amount of from about 0.05 to 2.5 parts by weight per 100 parts by weight of said organic polyol. Excess amounts of the magnesium oxide may be used but do not appear to provide any significant results.

Other well known constituents can be added to the polyurethane foam recipes as set forth in U.S. Pat. No. 3,574,149. Such constituents can be added in various amounts to the foaming ingredients to achieve the desired properties in the resultant flexible, low density foams.

The various ingredients or components employed in the method of this invention can be mixed in any way so long as the isocyanate component is essentially the last to be added. Such mixing is ameliorated if those components which are not easily mixable are pre-mixed with part of some other component. For example, any tin catalyst because of the small amounts used is more easily evenly dispersed in a foam system if it is added as a pre-mix with a portion of the polyol, usually as a separate stream. Similarly, any solid flame retardant such as the PVC polymers is preferably added as a dispersion in a portion of the polyol.

Furthermore, it is preferable to pre-mix several components or portions thereof to improve the efficiency of this invention as well as, incidentally, to reduce the number of streams to be introduced into a mixing head on a production line. Two pre-mix streams can themselves be pre-mixed together if desired. Pre-mixes are particularly desirable if they are storage stable.

The flexible, cellular urethane-vinyl chloride polymeric foams of the present invention can be used as cushions, mattresses, pillows, packing, cushioning material for furniture, automobiles, rug underlay, interior automobile and other vehicle door panels, seats, arm rests, head rests, and so forth.

The following examples are intended to illustrate more fully the best presently known modes of practicing this invention but not to limit the invention, which is properly delineated in the claims. Unless otherwise stated, all quantitative measurements are by weight.

EXAMPLE I

Four mixing streams A, B, C and D were employed in this example:

| | Parts | Material |
|---|---|---|
| A | 66.0 | A commercial partially primary |

| Parts | | Material |
|---|---|---|
| | | hydroxyl capped 3000 mol. wt. polyoxypropylene triol having a pH of 6.0 ± 0.5 (Poly X-202 Olin Chemical Company) |
| | 4.40 | Water |
| | 1.20 | A commercial polyoxyalkylene polysiloxane surfactant (L540) Union Carbide) |
| | 0.30 | Magnesium oxide MgO (activity number 20) |
| | 0.21 | A 33% solution of triethylene diamine in dipropylene glycol |
| | 0.07 | Dimethylcyclohexylamine |
| | 8.0 | Trichlorofluoromethane |
| B | 30.00 | The polyoxypropylene triol used in Stream A |
| | 6.0 | A solid PVC plastisol grade resin having an average particle size of 1.0 microns and an inherent viscosity (ASTM D 1243-Goodrich) |
| | 0.15 | Magnesium oxide MgO (activity number 20) |
| | 2.80 | Antimony oxide $Sb_2O_3$ |
| | 0.90 | Zinc oxide Zno (French Process) |
| C | 0.4 | Stannous oleate dispersion in dioctylphthalate (17% Sn) |
| | 4.0 | The polyoxypropylene triol used in stream A |
| D | 52.5 | An 80/20 mixture of the 2,4- and 2,6- isomers of toluene diisocyanate (TDI) (102 Index) |

The subject streams were mixed in an Admiral mixing head at 25°C. and the resulting mixture was pumped into a hot mold (105°F.) and allowed to cure for 13–14 minutes at 350°F. Examination of the resulting foam showed uniform surface characteristics with no evidence of uncured areas where the materials puddled prior to molding.

The resulting products passed the flammability requirements of Federal Motor Vehicles Specification FMVSS-302. Increasing the amounts of magnesium oxide and dimethylcyclohexyl amine in stream A to 0.35 to 0.08 part respectively, increasing the amount of TDI in stream D to 54.0 parts and adding 8.0 parts of trichlorofluoromethane in various runs did not affect the flame resistance of the foam and produced only expected changes in the other physical properties of the resulting foam.

EXAMPLE II

The preferred commercial formulation for the desired results now consists of four mixing streams A, B, C and D as follows:

| | Parts | Material |
|---|---|---|
| A | 76.0 | The polyoxypropylene triol of stream A in Example I |
| | 4.4 | Water |
| | 1.0 | The surfactant of stream A in Example I |
| | 0.35 | Magnesium oxide MgO (USP-20) |
| | 0.48–0.54 | The triethylene diamine solution of stream A in Example II |
| B | 20.0 | The polyoxypropylene triol of stream A |
| | 6.0 | A commercial PVC dispersion resin having an inherent viscosity of 0.85–0.97 (ASTM D-1243, Procedure A) and a specific gravity of about 1.40 (QYJV Union Carbide) |
| | 2.8 | Antimony oxide $Sb_2O_3$ |
| | 0.9 | Zinc oxide ZnO |
| | 0.2–0.4 | Magnesium carbonate $MgCO_3$ (USP) |
| C | 0.4 | The stannous oleate dispersion of stream C in Example I |

| | Parts | Material |
|---|---|---|
| | 4.0 | The polyoxypropylene triol used in stream A |
| D | 52–56 | The TDI isomer mixture of stream D in Example I |

Substitution of 07 part of calcium carbonate $CaCO_3$ for the magnesium oxide in Stream A produces the same excellent results.

I claim:

1. In the method of making a flexible or semi-flexible hot-molded low density, fire retardant polyurethane foam by the reaction of (A) a polyetherpolyol having from two to four hydroxyl groups and having a molecular weight of from about 1,000 to 10,000, (B) an organic polyisocyanate and (C) a blowing agent comprising water in admixture with (D) a surfactant, (E) a catalyst comprising from about 0.05 to 3.2 parts by weight per 100 parts by weight of said polyol of a tertiary amine and from 0.1 to 0.9 part by weight per 100 parts by weight of said polyol of a tin-containing polyurethane catalyst (F) from about 1 to 50 parts by weight per 100 parts by weight of said polyol of a finely divided, solid chlorine-containing polymeric resin containing an average of from 0.4 to 1 chlorine atom per carbon and having an intrinsic viscosity of from about 0.25 to 2.5 as measured in 0.3 percent by weight solution in cyclohexanone at 25°C., (G) finely divided zinc oxide in an amount of from about 0.1 to 10 parts by weight per 100 parts by weight of said polyol (A), (H) finely divided antimony trioxide in an amount of from about 0.5 to 15 parts by weight per 100 parts by weight of said polyol (A), and, optionally, (J) a chlorinated paraffin having an average molecular weight of from about 250 to 1400 and containing from about 40 to 70% by weight of chlorine, using the one-shot prepolymer process, the improvment comprising incorporating in said formulation from 0.5 to 2.5 parts by weight per 100 parts by weight of polyetherpolyol (A) of at least one compound selected from the class consisting of oxides, hydroxides and basic salts of metals from Group 2a of the Periodic Table of the Elements, said metals having atomic numbers of 12 to 20 inclusive, said compounds having an average particle size of from about 0.05 to 200 microns, any magnesium oxide having an activity number of 0 to about 60, there being at least 0.05 part by weight of said compounds in any premix of components containing at least 10 parts by weight of polyetherpolyol (A).

2. The method according to claim 1 in which the polyol (A) is a polyalkylene ether polyol.

3. The method according to claim 2 in which the resin (F) is selected from the group consisting of polyvinyl chloride, a copolymer of a major amount of vinyl chloride and a minor amount of vinyl acetate, a partially hydrolyzed copolymer of a major amount of vinyl chloride and a minor amount of vinyl acetate, and chlorinated polyethylene, and is used in an amount of from about 2 to 25 parts by weight, the zinc oxide (G) is used in amount of from about 0.2 to 5 parts by weight and the antimony trioxide (H) is used in an amount of from about 1 to 10 parts by weight, the amounts of said (F), (G) and (H) being based on 100 parts by weight of said polyol.

4. A flexible or semi-flexible hot-molded low density, fire retardant polyetherurethane foam, the ether moieties of said foam being derived from polyetherpolyols having from two to four hydroxyl groups and having a molecular weight of from about 1,000 to 10,000, said foam containing from about 1 to 50 parts by weight per 100 parts by weight of said polyol of a finely divided, solid chlorine-containing polymeric resin containing an average of from 0.4 to 1 chlorine atom per carbon and having an intrinsic viscosity of from about 0.25 to 2.5 as measured in 0.3 percent by weight solution in cyclohexanone at 25°C., finely divided zinc oxide in an amount of from about 0.1 to 10 parts by weight per 100 parts by weight of said polyol, finely divided antimony trioxide in an amount of from about 0.5 to 15 parts by weight per 100 parts by weight of said polyol, and, optionally, a chlorinated paraffin having an average molecular weight of from about 250 to 1400 and containing from about 40 to 70% by weight of chlorine, said foam being particularly characterized in containing from 0.05 to 2.5 parts by weight per 100 parts by weight of polyetherpolyol of at least one compound selected from the class consisting of oxides, hydroxides and basic salts of metals from Group 2a of the Periodic Table of the Elements, said metals having atomic numbers of 12 to 20 inclusive, said compounds having an average particle size of from about 0.05 to 200 microns, any magnesium oxide having an activity number of 0 to about 60.

5. The method according to claim 3 wherein said Group 2a metals are present as carbonates.

6. The method according to claim 3 wherein said Group 2a metals are present as compounds selected from the group consisting of calcium carbonate, magnesium carbonate and magnesium oxide.

7. The method according to claim 6 wherein said Group 2a metal is magnesium.

8. A composition according to claim 4 wherein said Group 2a metals are present as compounds selected from the group consisting of calcium carbonate, magnesium carbonate and magnesium oxide.

9. A composition according to claim 8 wherein said Group 2a metal is magnesium.

* * * * *

UNITED STATES PATENT OFFICE
CERTIFICATE OF CORRECTION

PATENT NO. : 3,931,062
DATED : January 6, 1976
INVENTOR(S) : David Stanley Cobbledick It is certified that error appears in the above-identified patent and that said Letters Patent are hereby corrected as shown below:

Column 10, line 38, which reads: "one-shot prepoly-"

should read ---one-shot or prepoly---.

Signed and Sealed this thirtieth Day of March 1976

[SEAL]

Attest:

RUTH C. MASON
Attesting Officer

C. MARSHALL DANN
Commissioner of Patents and Trademarks